United States Patent
Jones et al.

(10) Patent No.: US 10,387,829 B2
(45) Date of Patent: Aug. 20, 2019

(54) METHOD AND APPARATUS FOR USING LABEL DATA TO ASSIST IN PERFORMING A RETAIL STORE FUNCTION

(71) Applicant: Walmart Apollo, LLC, Bentonville, AR (US)

(72) Inventors: Nicholaus A. Jones, Fayetteville, AR (US); Matthew A. Jones, Bentonville, AR (US); Robert J. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 399 days.

(21) Appl. No.: 15/282,122

(22) Filed: Sep. 30, 2016

(65) Prior Publication Data
US 2017/0091705 A1    Mar. 30, 2017

Related U.S. Application Data (60) Provisional application No. 62/234,901, filed on Sep. 30, 2015.

(51) Int. Cl.
| | | |
|---|---|---|
| *G06Q 10/08* | (2012.01) | |
| *G06F 16/14* | (2019.01) | |
| *G06K 9/00* | (2006.01) | |
| *G06K 9/20* | (2006.01) | |
| *G06K 9/22* | (2006.01) | |

(52) U.S. Cl.
CPC ......... *G06Q 10/087* (2013.01); *G06F 16/148* (2019.01); *G06K 9/00664* (2013.01); *G06K 9/20* (2013.01); *G06K 9/228* (2013.01)

(58) Field of Classification Search
CPC ...................................................... G06Q 10/08
USPC ........................................................... 705/28
See application file for complete search history.

(56) References Cited

U.S. PATENT DOCUMENTS

| | | | |
|---|---|---|---|
| 8,010,402 B1 | 8/2011 | Sharma | |
| 8,229,252 B2 | 7/2012 | Cohen | |
| 8,651,389 B2 | 2/2014 | Shastri | |
| 8,873,829 B1 | 10/2014 | Tyra | |
| | (Continued) | | |

FOREIGN PATENT DOCUMENTS

WO    2009154484    12/2009

OTHER PUBLICATIONS

Rai, H., "A Video Analytics Solution for Discovering Customer Shopping Behaviour in Retail Stores," Matlab Expo 2012 India, The MathWorks, Inc., 14:30-15:15.

*Primary Examiner* — Russell S Glass
(74) *Attorney, Agent, or Firm* — Fitch, Even, Tabin & Flannery LLP (57) ABSTRACT

In some embodiments, apparatus, systems and methods are disclosed that utilize label data to assist in performing a retail store function. For example, label data may be utilized to provide an image of a label to help a store associate perform a bin, pick, stock or price change request. In some forms, the label data comprises a print data file which may be used to display the image of the label to the store associate. In other forms, the label data may comprise a larger data set representing the label image itself such as bit map data. In yet other forms, a hybrid of both image data and print file data may be used. In addition, timestamp and location data may also be used to help assist in performing the requested store function more quickly and efficiently.

17 Claims, 5 Drawing Sheets

(56) References Cited

U.S. PATENT DOCUMENTS

| | | |
|---|---|---|
| 2008/0303902 A1 | 12/2008 | Romer |
| 2009/0182622 A1 | 7/2009 | Agarwal |
| 2014/0089313 A1* | 3/2014 | Brown .................. G06Q 10/10 707/740 |
| 2014/0195374 A1 | 7/2014 | Bassemir |
| 2014/0244392 A1 | 8/2014 | Chang |

* cited by examiner

METHOD AND APPARATUS FOR USING LABEL DATA TO ASSIST IN PERFORMING A RETAIL STORE FUNCTION

CROSS-REFERENCE TO RELATED APPLICATIONS

This application claims the benefit of U.S. Provisional Application No. 62/234,901, filed Sep. 30, 2015, which is incorporated herein by reference in its entirety.

TECHNICAL FIELD filed This invention relates generally to retail store management and, more particularly, to systems, apparatus and methods for improving store management using label data to assist in performing a retail store function.

BACKGROUND

Some primary objectives of conventional retail stores are to provide consumers or customers with the items they need and to do so efficiently so as to maximize sales. One of the leading causes of lost sales is a lack of product availability, such as out of stock product (either missing from shelf and in a back room or missing entirely from that particular store), moved product and/or misplaced product. In order to address this issue, many retail stores utilize complex inventory management software programs and employ many store associates to keep track of product inventory and ensure that such inventory is on hand and in stock when needed.

Many of these systems, however, require user input such as product scanning and rely on store associates to be able to quickly and efficiently locate product inventory in a backroom or elsewhere so that it can be stocked and re-stocked on the store shelves as quickly and efficiently as possible. Errors that occur within the inventory management system are typically due to user input errors. For example, incorrect scans or failure to take necessary scans can cause the system to slow down and not work as quickly and efficiently as desired. In larger stores that rely heavily on the efficiency of such inventory management systems, any delay due to inefficiencies or errors can be compounded and have trickle down effects throughout the system as a whole. For example, delay in being able to restock one product due to inefficiencies, typically leads to delay in the store associate's ability to handle restocking requests for other products and so on, and ultimately may lead to an unenjoyable shopping experience for customers because either the desired product they want is not stocked on the shelf or they are required to ask for assistance to locate the missing item. In addition, such inefficiencies prevent store associates from being able to offer general assistance to store customers or consumers and, thus, can negatively impact the shopping experience for several individuals.

Accordingly, it has been determined that a need exists for improved systems, apparatus and methods for managing stores to overcome the above-mentioned problems.

BRIEF DESCRIPTION OF THE DRAWINGS

Disclosed herein are embodiments of systems, apparatuses and methods for using pertaining to improved store management using feedback from customers.

This description includes drawings, wherein.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking and pursuant to various embodiments, systems, apparatus and methods are provided herein that utilize label data to assist in performing a retail store function. In some embodiments, systems, apparatus and methods are disclosed that utilize a label print file to be used to assist a store associate in performing a store function. For example, during a pick request, a label print file may be used to provide a store associate with a picture of the label of the type the store associate has been requested to pick in order to expedite the pick process. In a preferred form, the image would appear in color on the color screen interface of a handheld device carried by the store associate (e.g., a smart phone, a scanner device with display, etc.). More particularly, in one instance, the label print file may provide data to pull up an image of the label that was taken during the binning process to show the user what the label of the product they are looking for looks like. In some examples, the associate would only need to take a photo of the item in the bin rather than separate scans of each item during the bin process. Other store systems or systems of the handheld device itself may also be used to capture additional data that is provided with or as part of the label print file data, such as store video, GPS system data or wifi locationing to provide location and/or time stamp data associated with the product as well so that the user can be assured that the most recent image and/or location of the product that is the subject of the pick request is provided.

While such a system would already expedite the pick request process due to the assistance it provides in finding the requested item, the system could further expedite the process by eliminating the need for the associate to do a separate pick scan as they are able to visually compare the label of the product pulled to fill the pick request to the image provided. In larger retailers or retailers selling a large number of products, the ability to eliminate a single scan can save a significant amount of time and help free-up the store associates to move on to other tasks faster and/or offer more assistance to customers.

While the above example illustrates how such a system may be utilized during a pick request, it should be understood that such a system could also be used during other store functions, such as for example the stocking process. Additionally, a unique identifier (e.g., indicator, symbol, etc.) could be printed on the label to further assist the store associate in identifying the correct item to complete the requested store function or task. For example, in some retail store systems the labels may be color coded to enable faster recognition for the store associate and further expedite the process. In other systems, a symbol may be used on the label so that the associate can spot and match the requested product from the product in inventory quicker than if they needed to read the entire label. In still other forms, both a symbol and color coding may be used if desired. By eliminating the need for scans and giving the associate an actual representation of the product label, the store management systems should work more efficiently and free-up the associate to do further tasks (e.g., move on to another pick or stocking request, help customers needing assistance or those who would benefit from further assistance, etc.). This would also reduce, if not eliminate, the above-mentioned user input errors that occur in conventional management systems.

Figure 1:
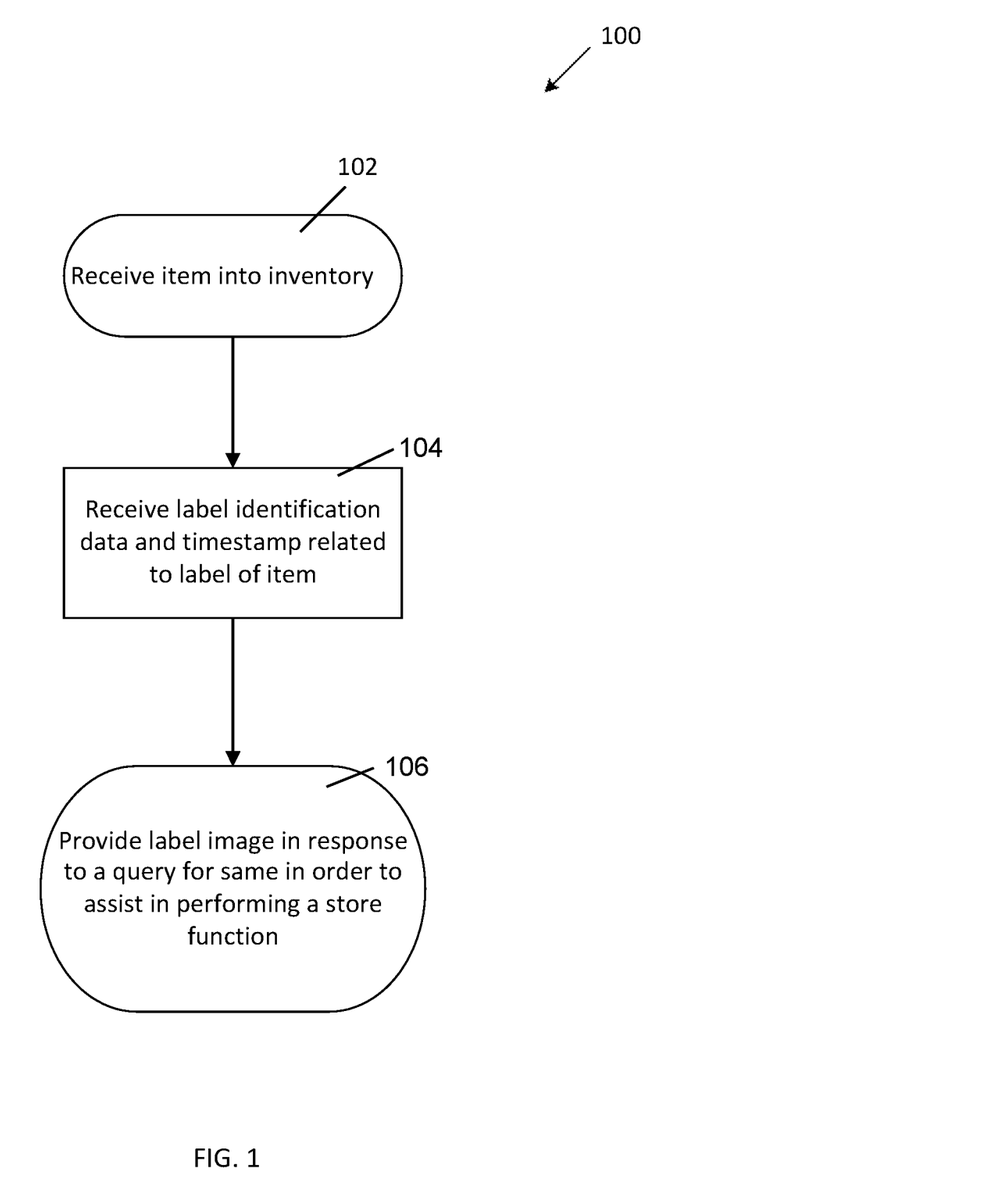
FIG. 1 is a flow diagram of a general process in accordance with some embodiments of the invention.

Turning now to the drawings and specifically, FIG. 1, there is shown an exemplary flow diagram illustrating a process by which a system or apparatus may operate in accordance with one embodiment of the invention disclosed herein. The flow diagram is referenced generally by reference numeral 100 and begins at step 102 with the apparatus or system receiving an item into inventory. Once received, the apparatus or system receives label identification data and timestamp data for related to the label of the item in step 104. As mentioned above, the apparatus or system could also calculate location of the item or where the label is printed to further provide this location data to a store associate tasked with trying to locate similar items for stocking or replenishment. Lastly, in step 106, the apparatus or system is setup to provide label image data in response to a query for same in order to assist the user in performing a store function. Thus, in the pick request example discussed above, the system or apparatus 100 may provide to a user label image file data representing what the label looks like for the product that a pick request has been generated for in order to assist the associate in finding that item more efficiently. The apparatus or system could also determine via a timestamp if the most recent label image is being used and/or provide location data if such data is desirable to assist the store associate in completing the task at hand.

Figure 2:
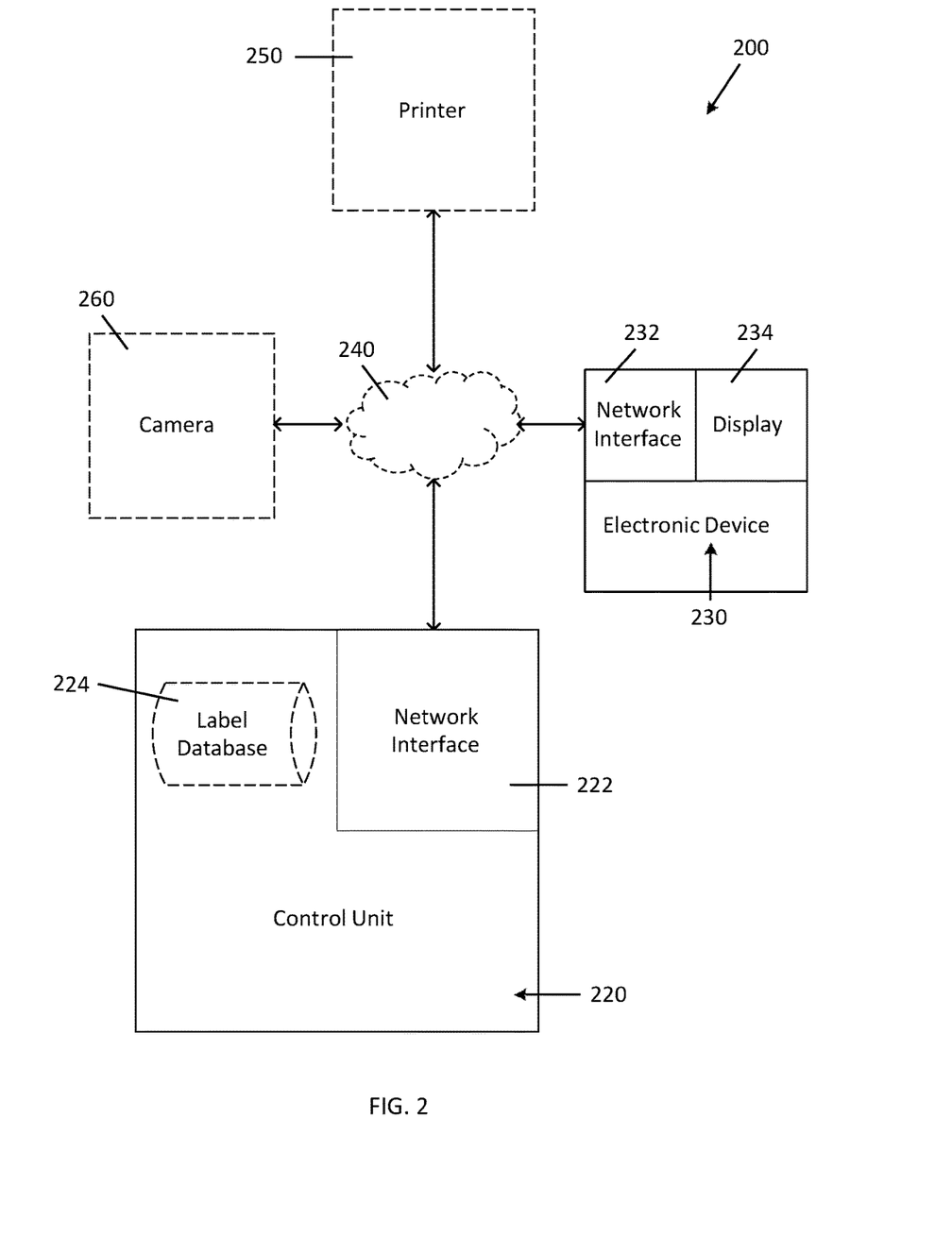
FIG. 2 is a diagram of a general system in accordance with several embodiments.

In FIG. 2, an exemplary apparatus or system is shown in accordance with some embodiments of the invention disclosed herein. The apparatus or system is referenced generally by reference numeral 200 and includes a main controller or control system 220 and a remote control unit, such as electronic device 230. In the form illustrated, the main control unit 220 includes a network interface 222 for connecting the control unit 220 to a network 240 (e.g., LAN, WAN, PAN, etc.), which can be setup as a wireless network, a hard-wired network or a combination of the two. In addition, the control unit 220 will also include a label database 224, which may be internally stored in the control unit 220 or, alternatively, stored remote from the control unit 220 such as a cloud-based database or remote database located separate and apart from control unit 220 but that remains in communication with same.

In a preferred form, electronic device 230 will also include a network interface 232 for communicating with the control unit 220 via network 240 and will also include a display 234 for displaying data entered into the electronic device 230 via a user and/or data received from the control unit 220, such as for example label file data from label database 224. The electronic device 230 may be any handheld or mobile device, such as a smart phone, a handheld scanner device with display, etc. In a preferred form, the device will have the ability to scan and take pictures via a camera.

As mentioned in the pick request example discussed above, in a preferred form, the system 200 may also utilize additional system equipment installed in the retail store, such as printers 250 and cameras 260, to further allow timestamp and/or location data to be provided along with or as part of the label file data provided to electronic device 230 so that store associates or other users know what label image they are looking for and where that product may be located in the backroom or elsewhere inside of or outside of the retail store. Other store systems, such as internal GPS or wifi locationing systems may also be used for this purpose.

It should be understood that the label data mentioned herein may be obtained in a variety of different ways and provided in a variety of different formats. For example, in one form the label data may consist of actual bit map data for a picture of the label taken during the bin process. The label data may also be provided to electronic device 230 as actual bit map data representative of the actual picture taken during the binning process. However, due to the size of such data files, in a preferred form, the label data will be provided in another data format, smaller in data size and representative of the actual picture that can be used to reconstruct the actual picture if and when it is necessary to send and display same on the display 234 of electronic device 230. For example, in some forms the label data may comprise a label print file used to print the label on a printer which is much smaller in size than a file representing the actual bit map data of the picture of the label itself. Thus, a smaller data file (e.g., smaller in size or smaller sized data file) containing the printer control language used to print a specified label on a label printer may be used instead of sending the larger file containing the actual image of the label, if desired. One exemplary embodiment of such a file is listed below, which is written in Zebra Programming Language (ZPL), a page description language (e.g., a language that describes the appearance of a printed page at a higher level without requiring an actual bitmap) from Zebra Technologies Corporation (of Lincolnshire, Ill.) for printing labels using label printers made by Zebra Technologies, Inc.:

^XA
^FO150,50
^A0,20,20
^FDItem: 6002354^FS
^FO150,100
^A0,20,20
^FDDesc: ACME ABC 1OZ^FS ^FO150,150
^BUn,80,y,n,y
^FD12345678901^FS
^XZ This smaller sized file may be used as the print label file and, more importantly, can be used to reconstruct and display the actual label image on the display 234 of electronic device 230. It should be understood that any page description language or printer control language may be used. For example, in other embodiments, Datamax Printer Language (DPL) may be used with Datamax label printers, Intermec Program Language (IPL) may be used with Intermec printers, Printonrix Graphics Language may be used with Printronix printers, Eltron Programming Language (EPL) may be used with older printers, etc. In addition, universal or multi-language label printers may be used, such as Printronix thermal barcode printers, which offer multiple printer language support (e.g., such as support for graphics languages for Printronix, Zebra, TEC, Sato, Intermec, Datamax, Monarch, etc. printers). Similarly, languages of other database-driven sign and label printing solutions may be used, such as AccessVia's dSIGN and Web dSignShop software.

In still other forms, a hybrid version of print data file may be used that begins with an actual bit map picture file of the label taken by a camera and is then converted to a printer control language file based on the picture image and the printer control language file is stored and transmitted to electronic device 230 when needed. This allows smaller file formats to be used and, thus, allows the data transmission to take place faster and more efficiently. Once received from the control unit 220, the electronic device 230 can display the image that would be printed by the printer control language file so that the user has an actual image of the label to look at and compare to the products he or she is going through to find the correct one.

Figure 3:
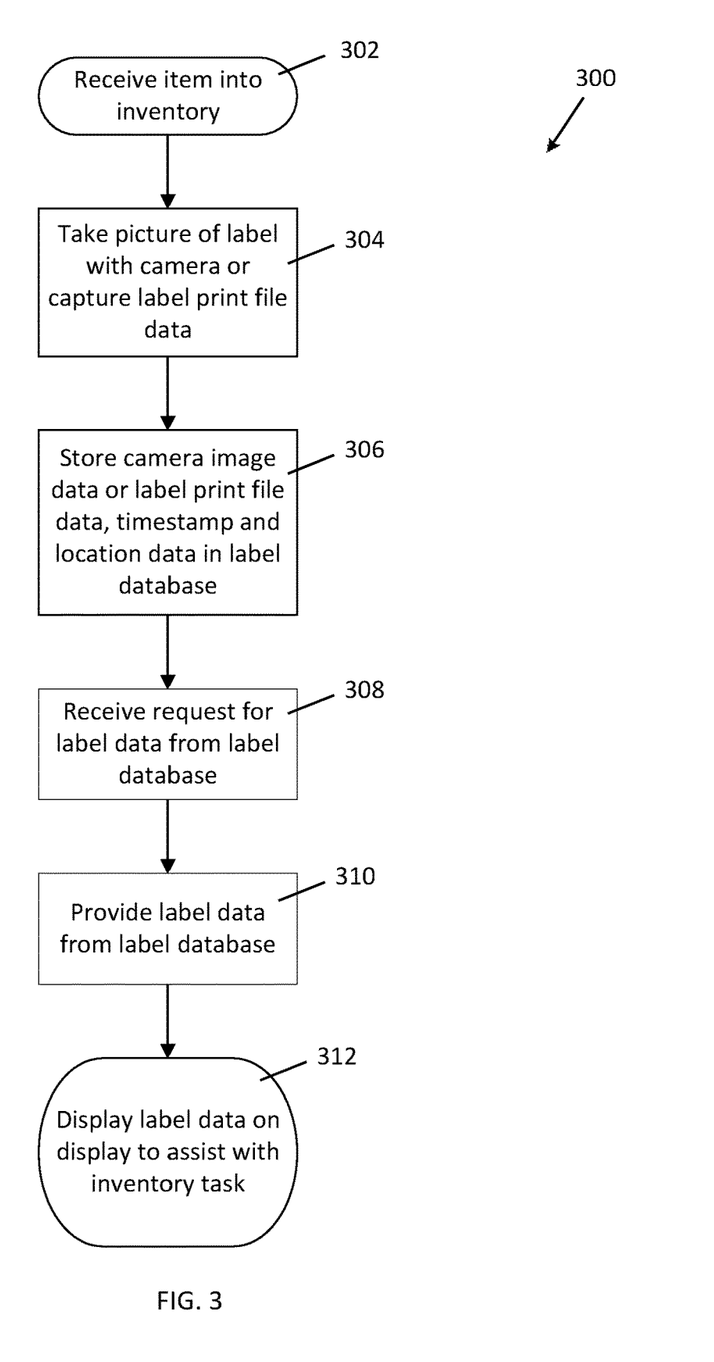
FIG. 3 is a flow diagram of a more specific process in accordance with some embodiments.

FIG. 3 illustrates another flow diagram for an apparatus, system or method operating in accordance with an exemplary embodiment of subject matter disclosed herein. In this figure, the apparatus, system or method is referred to generally by reference numeral 300 and begins with step 302 in which an item is received into inventory. A picture of the label or the printer control language file is captured as the label print file in step 304 and then stored in memory (such as on a label database) in step 306. Next, in step 308, a request for the label print file is received by the controller of the control unit and the label data file is provided to the requester from the memory or database location in step 310. The label image is then displayed on the display of the remote or handheld device in step 312 to assist in performing a retail store function (e.g., stocking, pick request, restocking, etc.).

Figure 4:
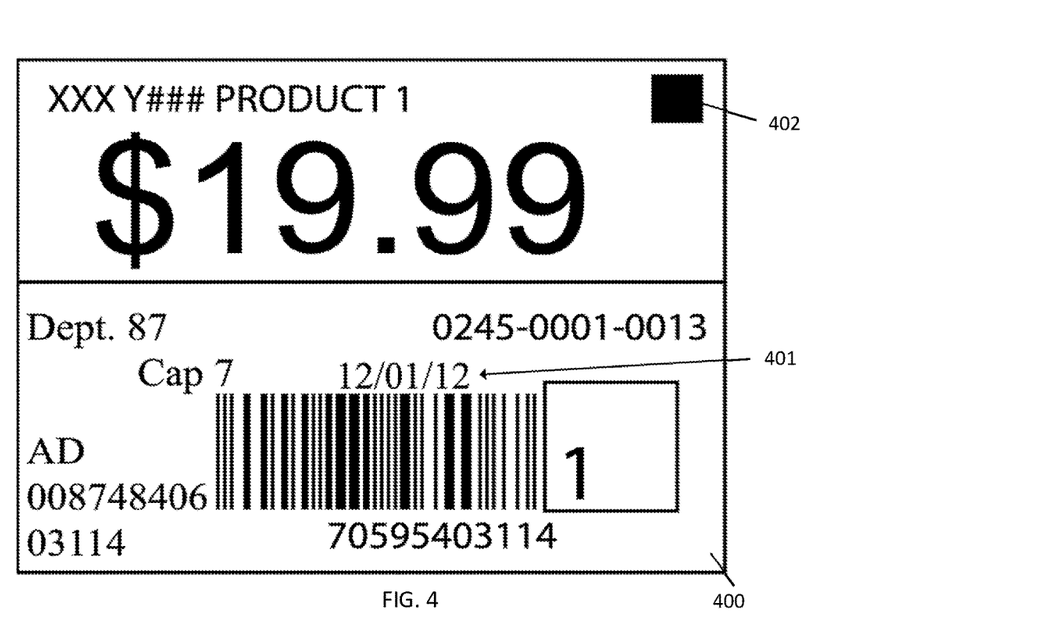
FIG. 4 is an exemplary inventory preparation label image that may be used in accordance with some embodiments of the invention.
Figure 5:
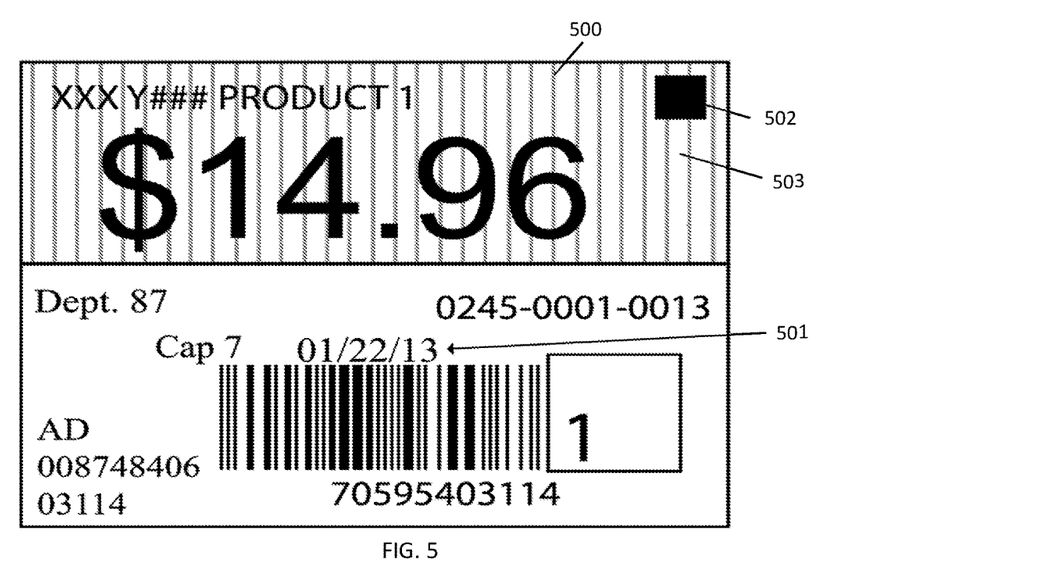
FIG. 5 is an exemplary price change label image that may be used in accordance with some embodiments of the invention, the drawing being lined for the color pink or red via the vertical lines appearing at an upper portion of the label.

As mentioned above, in addition to providing an image of the label of the product to be located, the system 300 may including additional data to help identify the correct label image for the store associate and/or help locate the item being sought via the providing of a timestamp and/or location data (e.g., such as GPS data, etc.). For example, system 300 may be used to provide an initial inventory price label image 400 as illustrated in FIG. 4. However, timestamp data may be utilized to provide a store associate with an updated label image, such as price change label 500 in FIG. 5, so that the store associate is looking for the correct label when he or she goes to perform a retail store function such as completing a pick request or restocking request. More often, however, the system 300 will be used for the reverse situation by giving the associate tasked with restocking or picking an image of the original label having the original price which was put on the item when binned so that the associate is not confused in instances where the label that appears on the sales floor or shelving is different from that which appears in the bin. For example, label 500 in FIG. 5 shows a price change label with a different price, time stamp 501 and color 503 (which is lined with vertical lines to represent the color red or pink) than the original price, time stamp 401 and color of the label of FIG. 4. When a pick request is made for the item with 0 500 of FIG. 5, the associate could get confused which item he or she is looking for since the price change label 500 is not going to be the same as the label that was originally on the item when binned and, thus, will not be the label the associate has to look for when completing the pick request or task. Rather, system 300 would display to the associate the image of the inventory prep label 400 of FIG. 4 which is what the label will look like in the bin to help the associate locate the proper item more quickly and efficiently. To further assist in this process, the labels may also include unique identifiers, such as symbols, that the associate may use to double check or confirm that the label of the item they are pulling from the bin is the correct item. In the form illustrated, a common square symbol is illustrated as identifier 402 in FIG. 4 and identifier 502 in FIG. 5. However, it should be understood that in alternate embodiments the identifier may take any form or shape (e.g., symbols, indicia, emojis, color swatch, etc.) so long as it serves the intended purpose of confirming for the associate that the correct item has been pulled to complete the requested store task.

It should also be understood that the content of the labels illustrated in FIGS. 4 and 5 is exemplary and may contain other data or content, layout, shapes, etc. For example, as discussed herein, it may be desirable to use different colors and sizes on labels to distinguish them for an intended purpose, etc. In some uses, the actual shape of the label or label type used may change over time to signify different things. For example, in some preferred systems, the inventory prep label of FIG. 4 may be smaller and/or of a different label type than the price change label of FIG. 5 (or vice versa). Thus, in such examples, it may also be desirable to have the label type or size in the label data so that the system can display the correct label image to the associate when performing the requested task. In hybrid systems like the one mentioned above where a photograph is taken of the label after it has already been applied to a product, the system could be setup to automatically or dynamically determine the label type or size from the photograph taken or image. In those same systems or other systems, the color of the label may be used to determine what type of label it is or what size it is so that the appropriate image is displayed to the associate. However, when just a print file is provided it would be preferable to include some data that specifies the label type is or size is so that the image that displays is accurate. In some forms, the system may utilize information regarding the printer used to print the label (e.g., location of printer, type or printer, printer language, etc.) in order to determine what type of label or size label should be displayed to the associate via the system. For example, if the location of the printer used to print the label was by the bins, the system may default to or assume an initial inventory price label should be displayed. If the location of the printer used to print the label was from a location associated with price change labels, then the system may default to or assume a price change label should be displayed.

Figure 6:
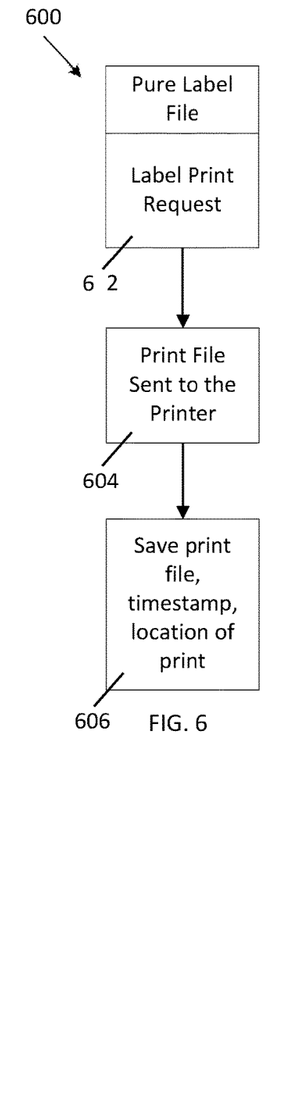
FIG. 6 is a flow diagram of a print label file process in accordance with some embodiments of the invention.

FIG. 6 illustrates a flow diagram of an apparatus, system or method that is capable of keeping track of the print file timestamp to ensure the correct label image is provided to a store associate when requested, but also capable of providing location information by keeping track of the location of the printer used to print the label and providing information relating to that location to the store associate requesting assistance in finding the requested product to fulfill a retail store function. The apparatus, system or method is referenced generally by reference numeral 600 and begins with step 602 in which a label print request has been made. This step is accomplished when a user requests to print a label. The print file is then sent to the printer to print a label in step 604 and the print file is saved, along with the timestamp and the location of printer that the label is printed on in step 606. In this way, the system 600 can provide the print file data to display an image of the proper label on the user's handheld or mobile device and point the user to at least a general area where the product would likely be given the location of the printer that was used to print the label for the item. By being able to provide location information of this type, the system 600 can further expedite the user's ability to complete the store function and is very helpful in larger retailers or retail stores which may have a very large warehouse or backroom for their facility.

Figure 7:
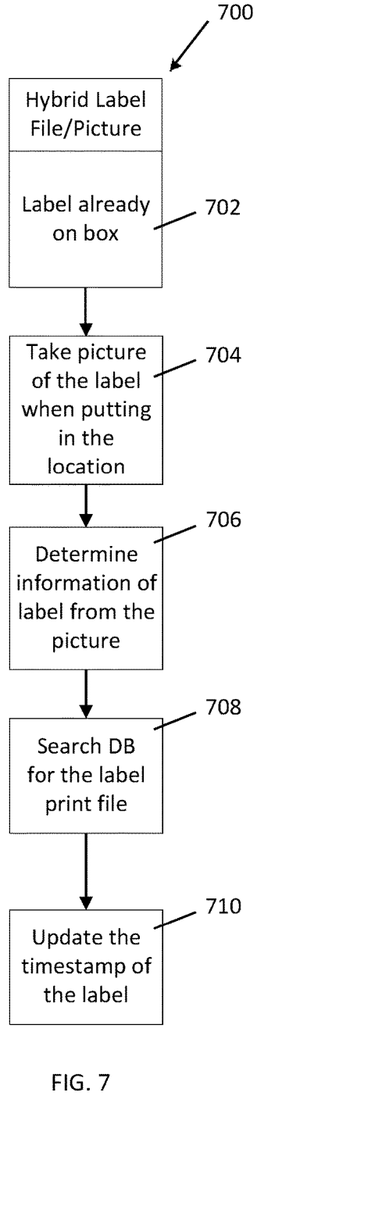
FIG. 7 is a flow diagram of an alternate print label file process that creates a file from a picture of an existing label.
Figure 8:
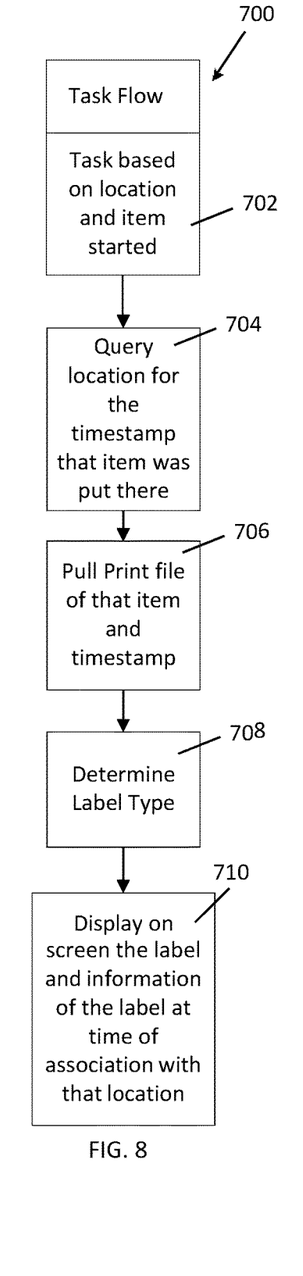
FIG. 8 is a flow diagram of an exemplary task flow process in accordance with some embodiments of the invention.

FIG. 7 illustrates another flow diagram for yet another apparatus, system or method in accordance with the subject matter disclosed herein. In this illustration, the apparatus, system or method is referred to generally by reference numeral 700 and is setup similar to the hybrid setup mentioned above where an actual camera picture or photo of the label is used briefly and then converted to a label print file to take advantage of the smaller size of such files and easier handling of same. The apparatus, system or method 700 begins with a product or item that already has label on it in step 702. The label image is then captured by taking a picture of the label in 704, such as when putting the item in a certain location (e.g., during binning, stocking, etc.). In step 706, the apparatus, system or method 700 determines information related to the label from the picture taken in step 704, such as the label print file data for such a label. The apparatus, system or method 700 then searches a database in step 708 for a label print file that matches that information and assigns that label print file to the item. The apparatus, system or method 700 further may be configured to update the timestamp for that label print file so that any future requests for same use the photograph or picture taken during step 704.

While a preferred form of apparatus, system or method 700 will have the label print files stored on the label database so that it can be searched, it should be understood that the apparatus, system or method 700 could further be configured to create a label print file from the image taken in step 704 and then store the image in memory such as in a label database and, thus, automatically or dynamically building and/or updating the label database as this information is provided. An advantage to an apparatus, system or method setup in this manner is that it can be retrofitted to work with existing inventory and does not have to be rolled-out gradually or on a rolling basis as new product is being labeled. Rather, since label print files can be created and added to the database, the system can be implemented retail store or chain wide immediately.

A general task flow in accordance with the subject matter disclosed herein is illustrated in FIG. 7 and is referenced generally by reference numeral 700. In a preferred form, the task flow 700 begins with determining the task being handled in step 702 based on the location and type of item that is being started with, which should indicate what retail store function is being performed (e.g., binning, stocking, responding to pick request, etc.). The task flow 700 then queries for the timestamp the item was placed in this location in step 704. Next, the print file and timestamp of that item is pulled in step 706 and the label type is determined in step 708. Once this is accomplished, the label image is displayed on the screen or display of the user's handheld device in step 710 ensuring that the image is of the last label associated with this item at the time the item was associated with this location in the retail facility. This ensures that the label the user will be looking for is the most recent version of the label on the item being sought when it was placed in this store location. Thus, as an example, if a pick request is made and the store associate goes back to find the product being requested and the label has recently changed from the original inventory preparation label (such as the one shown in FIG. 4) to a new price changed label (such as the one shown in FIG. 5), the image provided to the store associate will be that of the new price changed label since that is the most recent label image associated with that item when associated with the location the store associate has now gone to in order to complete the requested store function. Again, however, in many applications the system will be used in the opposite manner by displaying to the associate the original label image so that the associate is not confused by the alternate labels that may appear on the item out on the sales floor due to price changes, special deals being offered for the product, etc.

Thus, it should be understood that several different apparatus, systems and methods are disclosed herein for using label data to assist in performing a retail store function. For example, a computer implemented method is disclosed herein for utilizing label data to assist in performing a retail store function that includes, by a control circuit, receiving label identification data and timestamp information related to a label of an item to be sold by a retail store, and providing a label image generated from the received label identification data in response to a query for same in order to assist in performing a store function requiring a search for the item. In some forms, the method includes receiving location data along with the label identification data and timestamp information and providing location information in addition to the label image generated from the received label identification data so that an associate is directed to a specific location and provided the label image to assist in locating the item sought.

The store function may be at least one of a bin process, a pick process, a stocking process and/or a price change process and the method may include receiving at least one of data pertaining to a label camera image and/or data pertaining to a label print data file. More particularly, in one form, the data comprises receiving a label print file corresponding to the item label and may include receiving location data along with the label identification data and timestamp information which corresponds to a printer location for a printer that the label print file was sent to in order to generate the item label so that an associate is directed to a specific location and provided the label image to assist in locating the item sought. The method may also include storing the received label print file in a label print file database for later recall to assist in locating the item when sought.

The method may also include receiving a request for the label image associated with a particular item being sought, searching the label print file database for the label print file corresponding to the particular item being sought, generating the label image for the particular item being sought from the label print file and providing the label image for the particular item being sought to assist in locating the item during the performance of the retail store function. In a preferred embodiment, the label print file database contains a plurality of label print files and associated timestamp information and location data for each label print file and the method further comprises receiving updated data pertaining to at least one of the label print files, time stamp information and location data and updating the database with the updated data to assist in locating the item during the performance of the retail store function.

In alternative embodiments, the method may comprise using actual bit map data pertaining to the camera image of the label. For example, the method may include receiving picture data representative of a picture of the item label taken at the time the item is put into a location, and/or storing the received picture data in a database for later recall to assist in locating the item when sought.

In still other forms, the method may comprise a hybrid method utilizing both the bit map data of an actual image and a corresponding label print file for same. For example, the method may include determining label information from the picture data, creating a corresponding label print file from the determined label information and storing the corresponding label print file on a label print file database for later recall to assist in locating the item when sought. In some forms, the method may include receiving a request for the label image associated with a particular item being sought, searching the label print file database for the label print file corresponding to the particular item being sought, generating the label image for the particular item being sought from the label print file and providing the label image for the particular item being sought to assist in locating the item during the performance of the retail store function.

In addition to the above methods, a variety of apparatus and systems are also disclosed herein that utilize label data to assist a user in performing a retail store function. For example, a system for assisting in the performance of a retail store function is disclosed herein having a control device with a control circuit and first network interface, a label database accessible by the control device and containing label identification data, a remote electronic device having a second network interface, the remote electronic device in communication with the control device, and wherein the control device is configured to: receive label identification data and timestamp information related to a label of an item to be sold by a retail store; store the label identification data on the label database; and provide a label image generated from the received label identification data and timestamp information on the display of the remote electronic device to assist in the performance of a retail store function that involves searching for an item. As with the above-mentioned methods, the store function may be at least one of bin process, a pick process, a stocking process and/or a price change process and the remote electronic device may be a handheld electronic device that a store associate may use to receive on the display the label image to assist the store associate in locating the item required to perform the store function.

In some forms, the system may include a control unit with memory and the label database is stored in the control unit memory. In yet other forms, the label database may be stored on memory located remote from the control unit, such as a cloud-based server system or a remote server system located at a remote facility such as a corporate headquarters or central processing center. The system may also include a printer in communication with at least one of the control unit and/or the remote electronic device for printing labels and the label identification data may comprise a label print file which the control unit uses along with the time stamp information to generate the label image for the display of the remote electronic device to assist in locating the sought item. In a preferred form, the label identification data will include location data pertaining to the location of the printer used to print the label which the control unit uses along with the label print file and time stamp information to display the label image of the item being sought and location data relating to the location of the item being sought on the remote electronic device display to assist in performing the retail store function.

In alternate forms and as mentioned with the methods above, the system may utilize actual picture image data such as bit map data, to represent and reconstruct and display the label image on the store associate's handheld device. For example, the system may include a camera in communication with at least one of the control unit and/or the remote electronic device for capturing picture data representative of a picture of the label so the control system can generate the label image for the display of the remote electronic device to assist in locating the item being sought. Location data may be captured along with the picture data which the control unit uses along with the picture data and time stamp information to display the label image of the item being sought and location data relating to the location of the item being sought on the store associate's remote electronic device display to assist in performing the retail store function.

In addition to methods and systems, various apparatus are disclosed herein for utilizing label data to assist a store associate in performing a retail store function. For example, an apparatus for displaying a current label image of an item being sought to assist in the performance of a retail store function is disclosed herein having means for storing label identification data pertaining to a plurality of items to be sold by a retail store, and means for displaying a current label image of an item being sought on a remote electronic device display to assist an associate in the performance of a retail store function. In some forms, the means for storing the label identification data further includes means for storing location data pertaining to a location of each of the plurality of items to be sold by the retail store so that the location for the item being sought may be displayed on the remote electronic device display along with the current label image in order to assist the associate in performance of the retail store function.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept. It should also be understood that while certain features have been described with a specific embodiment, features of different embodiments may be combined with one another to form yet other embodiments as desired.

What is claimed is:

1. A computer implemented method for utilizing label data to assist in performing a retail store function comprising:
   a mobile device, wherein the mobile device is configured to be carried by an employee of the retail store, and wherein the mobile device includes a display device;

a control circuit, wherein the control circuit is communicatively coupled to the mobile device, the control circuit configured to:
 receive an image of a label of an item to be sold by a retail store;
 receive location data and timestamp information for the label;
 convert the image of the label of an item to be sold by a retail store to a printer control language file;
 receive, from the mobile device, a request for the image of the label of an item to be sold by a retail store;
 retrieve, based on the request for the image of the label of an item to be sold by a retail store, the printer control language file; and
 transmit, to the mobile device, the printer control language file;
wherein the mobile device is configured to:
 receive, from the control circuit, the printer control language file;
 present, via the display device to the employee of the retail store, a label image generated from the printer control language file; and
 present, via the display device to the employee of the retail store in association with the label generated from the printer control language file, the location data and timestamp information for the label.

2. The method of claim 1 wherein the store function is at least one of a bin process, a pick process, a stocking process and/or a price change process and receiving label identification data comprises receiving at least one of data pertaining to a label camera image and/or data pertaining to a label print data file.

3. The method of claim 1 further comprising storing the printer control language file in a label print file database for later recall to assist in locating the item when sought.

4. The method of claim 3 further comprising, searching the label print file database for the printer control language file corresponding to the particular item being sought.

5. The method of claim 3 wherein the label print file database contains a plurality of label print files and associated timestamp information and location data for each label print file and the method further comprises receiving updated data pertaining to at least one of the label print files, time stamp information and location data and updating the database with the updated data to assist in locating the item during the performance of the retail store function.

6. The method of claim 1 wherein receiving the image of the label comprises receiving picture data representative of a picture of the item label taken at the time the item is put into a location.

7. The method of claim 6 further comprising storing the received picture data in a database for later recall to assist in locating the item when sought.

8. A system for assisting in the performance of a retail store function comprising:
 a control device having a control circuit and first network interface;
 a label database accessible by the control device and containing label identification data; and
 a remote electronic device having a second network interface, the remote electronic device in communication with the control device;
 wherein the control device is configured to:
  receive an image of a label of an item to be sold by a retail store;
  convert the image of the label of an item to be sold by a retail store to a printer control language file;
  store, on the label database, the printer control language file;
  receive, from the remote electronic device, a request for the image of the label of an item to be sold by a retail store; and
 the remote electronic device configured to:
  receive, from the control device, the printer control language file;
  present, via a display device of the control device, a label image generated from the printer control language file to assist in the performance of a retail store function that involves searching for an item; and
  present, via the display device of the control device in associated with the label generated from the printer control language file, location and timestamp information for the label.

9. The system of claim 8 wherein the store function is at least one of a bin process, a pick process, a stocking process and/or a price change process and the remote electronic device is a handheld electronic device that a store associate may use to receiving on the display the label image to assist the store associate in locating the item required to perform the store function.

10. The system of claim 8 wherein the control unit includes memory and the label database is stored in the control unit memory.

11. The system of claim 8 wherein the label database is stored on memory located remote from the control unit.

12. The system of claim 8 further comprising a printer in communication with at least one of the control unit and/or the remote electronic device for printing labels.

13. The system of claim 12 wherein the label identification data further comprises location data pertaining to the location of the printer used to print the label which the control unit uses along with the label print file and time stamp information to display the label image of the item being sought and location data relating to the location of the item being sought on the remote electronic device display to assist in performing the retail store function.

14. The system of claim 8 further comprising a camera in communication with at least one of the control unit and/or the remote electronic device for capturing picture data representative of a picture of the label so the control system can generate the label image for the display of the remote electronic device to assist in locating the item being sought.

15. The system of claim 14 wherein location data is captured along with the picture data which the control unit uses along with the picture data and time stamp information to display the label image of the item being sought and location data relating to the location of the item being sought on the remote electronic device display to assist in performing the retail store function.

16. An apparatus for presenting a current label image of an item being sought to assist in the performance of a retail store function, the apparatus comprising:
 means for receiving an image of a label of an item to be sold by a retail store;
 means for converting the image of the label of an item to be sold by a retail store to a printer control language file;
 means for storing the printer control language file;
 means for retrieving, based on the request for the image of the label of an item to be sold by a retail store, the printer control language file;
 means for presenting a current label image of an item being sought on a remote electronic device display generated from the printer control language file to assist an associate in the performance of a retail store function; and means for presenting, in associated with the label generated from the printer control language file, location data and timestamp information for the label.

17. The apparatus of claim 16 wherein the means for storing the label identification data further includes means for storing location data pertaining to a location of each of the plurality of items to be sold by the retail store so that the location for the item being sought may be displayed on the remote electronic device display along with the current label image in order to assist the associate in performance of the retail store function.

\* \* \* \* \*